United States Patent
Lee

(10) Patent No.: US 9,202,122 B2
(45) Date of Patent: Dec. 1, 2015

(54) APPARATUS AND METHOD FOR DETECTING MEDIUM IMAGE, AND FINANCIAL DEVICE

(75) Inventor: Hyo-Wook Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 137 days.

(21) Appl. No.: 14/008,656

(22) PCT Filed: Mar. 27, 2012

(86) PCT No.: PCT/KR2012/002201
§ 371 (c)(1),
(2), (4) Date: Sep. 30, 2013

(87) PCT Pub. No.: WO2012/134137
PCT Pub. Date: Oct. 4, 2012

(65) Prior Publication Data
US 2014/0023228 A1    Jan. 23, 2014

(30) Foreign Application Priority Data

Mar. 28, 2011 (KR) .................. 10-2011-0027708

(51) Int. Cl.
*G06K 9/00* (2006.01)
*G06K 9/03* (2006.01)
*G07D 7/12* (2006.01)
*H04N 1/04* (2006.01)

(52) U.S. Cl.
CPC . *G06K 9/036* (2013.01); *G07D 7/12* (2013.01)

(58) Field of Classification Search
USPC .............. 382/100, 103, 106, 108, 112–115, 382/135–141, 162, 168, 173, 181, 191, 194, 382/199, 209, 219, 232, 254, 274, 276, 382/290–292, 286, 305, 312; 340/5.8; 358/474; 235/379
See application file for complete search history.

(56) References Cited

U.S. PATENT DOCUMENTS

| | | | |
|---|---|---|---|
| 4,197,584 A | 4/1980 | Blazek | |
| 5,790,245 A | 8/1998 | Kanesashi | |
| 6,249,591 B1 * | 6/2001 | Tullis | 382/106 |
| 6,501,087 B1 | 12/2002 | Koretsune et al. | |
| 6,766,045 B2 * | 7/2004 | Slepyan et al. | 382/135 |
| 7,599,544 B2 * | 10/2009 | Moshe | 382/141 |
| 7,715,613 B2 * | 5/2010 | Dobbs et al. | 382/135 |

(Continued)

FOREIGN PATENT DOCUMENTS

| CN | 1271910 A | 11/2000 |
|---|---|---|
| EP | 1321904 A1 | 6/2003 |

(Continued)

OTHER PUBLICATIONS

Supplementary European Search Report dated Feb. 13, 2014, in European Application No. 12762983.0.

(Continued)

*Primary Examiner* — Seyed Azarian
(74) *Attorney, Agent, or Firm* — Saliwanchik, Lloyd & Eisenschenk

(57) ABSTRACT

The present specification relates to an apparatus for detecting a medium image. According to one aspect, the apparatus for detecting the medium image comprises: a light emitting unit to emit the light toward the medium to be transferred along a transferring path; an image sensor having a light receiving unit to receive the light emitted from the light emitting unit; a reference medium which is arranged at a position separated from the transferring path and enables the image sensor to obtain an image; and a control unit to compensate the image of the medium obtained from the image sensor using the image of the reference medium obtained from the image sensor.

15 Claims, 4 Drawing Sheets

(56) References Cited

U.S. PATENT DOCUMENTS

| | | | |
|---|---|---|---|
| 8,004,725 B2* | 8/2011 | Schnitzlein | 358/474 |
| 8,225,989 B1* | 7/2012 | Turocy et al. | 235/379 |
| 8,542,094 B2* | 9/2013 | Talwerdi | 340/5.8 |
| 2011/0031386 A1 | 2/2011 | Pradel | |

FOREIGN PATENT DOCUMENTS

| | | |
|---|---|---|
| JP | 2009-002830 A | 1/2009 |
| KR | 10-1998-0014330 A | 5/1998 |
| KR | 10-0205778 B1 | 7/1999 |
| KR | 10-2007-0079635 A | 8/2007 |

OTHER PUBLICATIONS

Office Action dated Mar. 12, 2015 in Chinese Application No. 201280016900.4.

International Search Report in International Application No. PCT/KR2012/002201, filed Mar. 27, 2012.

* cited by examiner

APPARATUS AND METHOD FOR DETECTING MEDIUM IMAGE, AND FINANCIAL DEVICE

CROSS-REFERENCE TO RELATED APPLICATIONS

This application is the U.S. national stage application of International Patent Application No. PCT/KR2012/002201, filed Mar. 27, 2012, which claims priority to Korean Application No. 10-2011-0027708, filed Mar. 28, 2011, the disclosures of each of which are incorporated herein by reference in their entirety.

TECHNICAL FIELD

The present specification relates to an apparatus and method for detecting a medium image, and a financial device.

BACKGROUND ART

Generally, financial devices are devices that automatically process financial business desired by customers. The financial devices may deposit or withdrawal a medium (for example, bills, checks, certificates, etc) or transfer a medium.

Such a financial device may comprise a medium image detection apparatus. The medium image detection apparatus may detect a magnetic strip, images, a silver strip, fluorescent ink, various figures, various charters which are printed on a medium to determine a kind of medium, whether the medium is forged, and whether the medium is normal.

The medium image detection apparatus comprises an image sensor. The image sensor obtains image data of a medium. However, in the medium image detection apparatus according to the related art, an image obtained by the image sensor is changed in brightness by the external conditions such as a variation in transferring speed of the medium or an increase in ambient temperature due to heat generated by a motor. Thus, there is a limitation that a medium using the image obtained by the image sensor is deteriorated in recognition performance.

DISCLOSURE OF THE INVENTION

Technical Problem

An object of the present invention provides an apparatus and method for detecting a medium image, which is capable of compensating image data of a medium in real time to detect an accurate image of the medium, and a financial device.

Technical Solution

According to one aspect, an apparatus for detecting a medium image comprises: an image sensor comprising a light emitting unit to emit light toward a medium transferred along a transferring path and a light receiving unit to receive the light emitted from the light emitting unit; a reference medium disposed at a position that is deviated from the transferring path to allow the image sensor to obtain an image; and a control unit to compensate the image of the medium obtained from the image sensor by using the image of the reference medium obtained from the image sensor.

According to another aspect, a financial device comprises: a transferring path along which a medium is transferred; and a medium image detection apparatus comprising a reference medium fixed to a position that is deviated from the transferring path and an image sensor to obtain an image of the medium transferred along the transferring path and an image of the reference medium, wherein the medium image detection apparatus compensates the obtained image of the medium by using the image of the reference medium.

According to further another aspect, a method for detecting a medium image comprises: acquiring a real-time image of a reference medium fixed in position and an image of a transferred medium by using an image sensor; comparing the real-time image of the reference medium to a reference image of the reference medium, which is previously stored in a memory; and compensating the obtained image of the medium on the basis of the comparison result of the real-time image and the reference image of the reference medium.

Advantageous Effects

According to the proposed present invention, even though the medium M is changed in transferring speed or in brightness by an ambient temperature, the image of the medium M may be compensated by comparing the brightness of the reference image of the reference medium to the brightness of the real-time image of the reference medium and then reflecting the comparison result to obtain a medium image having constant brightness, thereby preventing the medium from being deteriorated in recognition performance.

MODE FOR CARRYING OUT THE INVENTION

Figure 1:
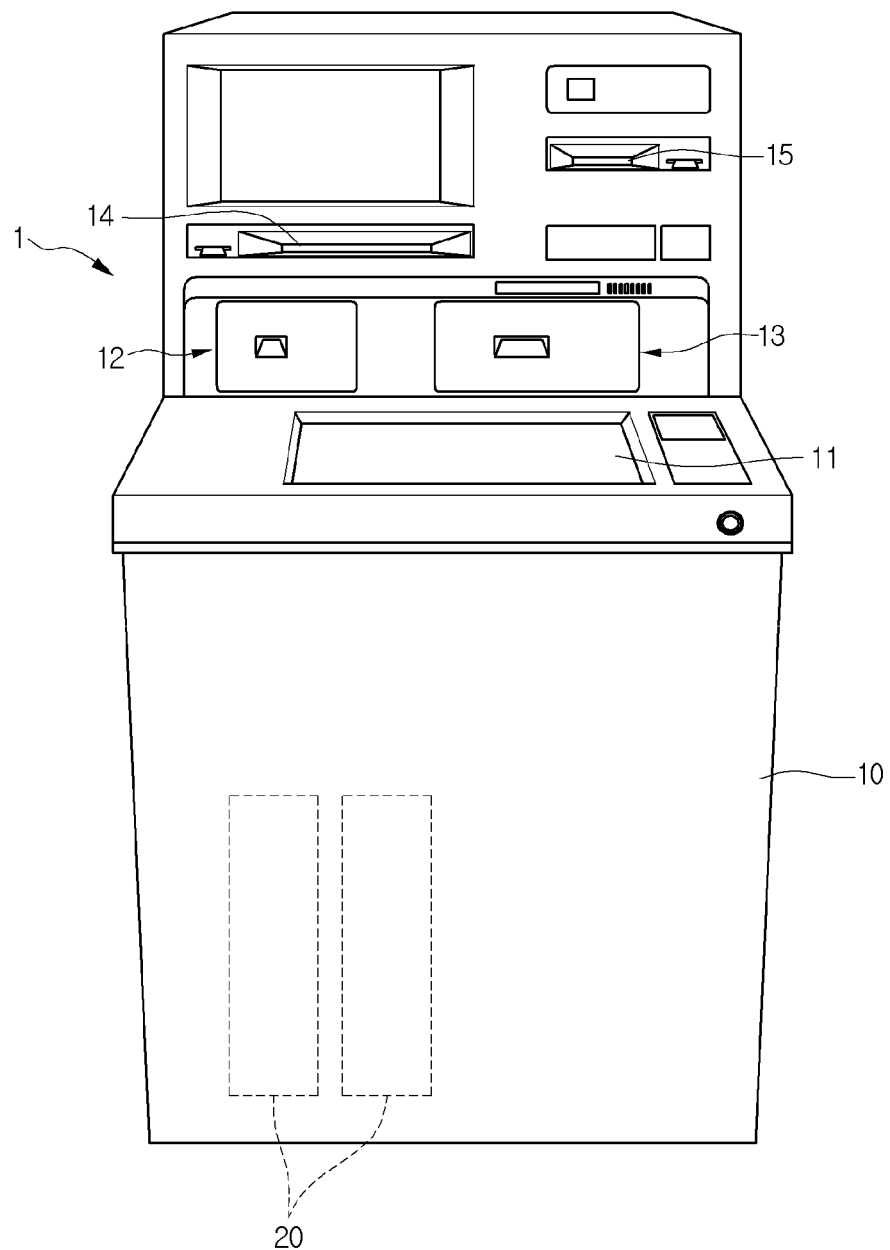
FIG. 1 is a perspective of a financial device according to the present invention.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a perspective of a financial device according to an embodiment.

Referring to FIG. 1, a financial device 1 according to the present invention comprises a main body 10 in which a plurality of parts are disposed. The main body 10 comprises an input unit 11 for allowing a user to process financial business, a check entrance 12 for depositing or withdrawing a check, a medium entrance 13 for depositing or withdrawing a medium, a bankbook entrance 14 for taking a bankbook in or out, and a card entrance for taking an integrated circuit card that processes the financial business in or out.

Here, at least one of the check entrance 12, the bankbook entrance 14, and the card entrance 15 may be omitted.

The main body 10 may further comprise at least one medium storage box 20. The medium cassette 10 may be a comprehensive concept comprising all of modules, which are disposed within the financial device 1 to store the medium, such as a temporary storage box for temporarily storing a medium deposited by a user, a recycle box for storing the deposited medium, a recovery box for storing an abnormal medium, and a cassette for storing the medium.

The financial device 1 may further comprise a medium image detection apparatus (that will be described later) for recognizing a medium.

A fundamental structure of the financial device 1 may be implemented by the well-known structure. Thus, detailed descriptions with respect to structures except for the medium image detection apparatus will be omitted.

Figure 2:
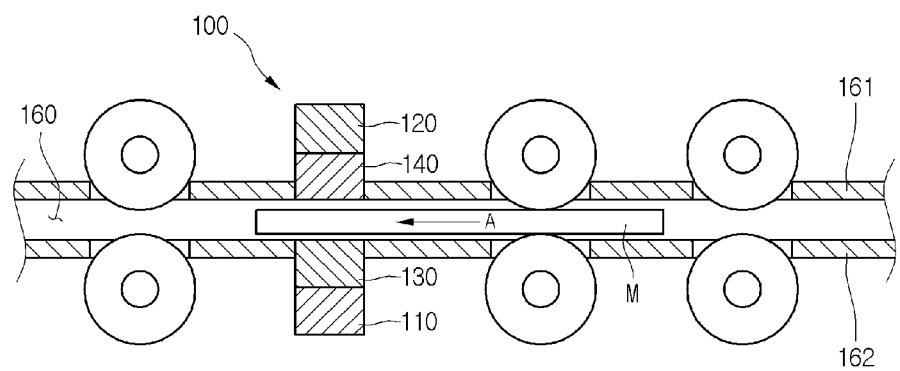
FIG. 2 is a side cross-sectional view of a medium image detection apparatus according to a first embodiment of the present invention.
Figure 3:
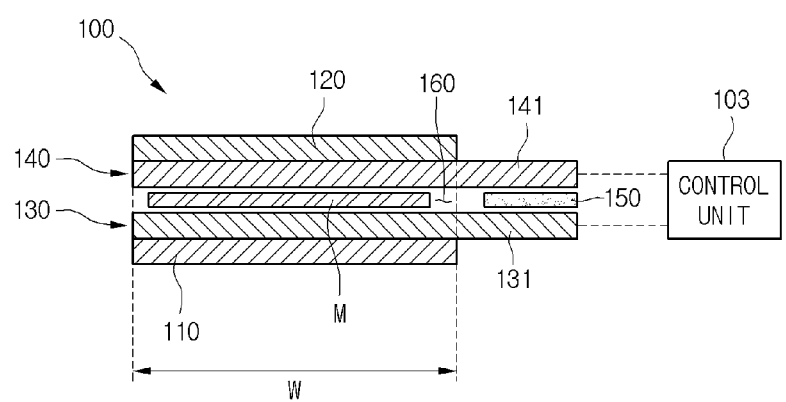
FIG. 3 is a front cross-sectional view of the medium image detection apparatus according to the first embodiment of the present invention.

FIG. 2 is a side cross-sectional view of a medium image detection device according to a first embodiment, and FIG. 3 is a front cross-sectional view of the medium image detection apparatus according to the first embodiment of the present invention.

Referring to FIGS. 2 and 3, a medium image detection apparatus 100 according to the first embodiment of the present invention comprises an image sensor.

In the current embodiment, the image sensor may be, for example, a transmission image sensor. Thus, the image sensor comprises a light emitting unit 130 and a light receiving unit 140 for receiving light that is emitted from the light emitting unit 130 to transmit a medium M. The light receiving unit 140 may receive the light transmitting the medium M to obtain an image of the medium M. For example, a light emitting diode (LED) may be used as the light emitting unit 130, but the present invention is not limited thereto.

The medium M may pass through a transferring path 160 between the light emitting unit 130 and the light receiving unit 140. Referring to FIG. 3, the medium M may be transferred within a range of a width W of the transferring path 160. The transferring path 160 may be defined by a pair of transferring guides 161 and 162.

The light emitting unit 130 may be disposed above a lower plate 110, and the light receiving unit 140 may be disposed under an upper plate 120. In this specification, the lower plate 110 and the upper plate 120 may be separately provided from the transferring guides 161 and 162 or be provided as portions of the transferring guides 161 and 162.

The medium image detection apparatus 100 may further comprise a reference medium 150. The reference medium 150 may be an object for additionally obtaining an image from the image sensor to compensate the image of the medium M to be processed in the financial device 1, which is obtained by the image sensor. That is, the image sensor may obtain each of the image of the medium M and the image of the reference medium 150.

The reference medium 150 may be deviated from the transferring path 160. That is, referring to FIG. 3, the reference medium 150 may be disposed at a position that is deviated from the range of the width W of the transferring path 160. Here, the width of the transferring path 160 may represent a length of the transferring path 160 in a direction horizontally crossing a transferring direction of the medium M.

The reference medium 150 may be manufactured by using a material having transmittance similar or equal to that of the medium M. Alternatively, the reference medium 150 may be manufactured by any material adequate for compensating the image of the medium M obtained by the light receiving unit 140.

For example, the reference medium 150 may be manufactured by using a material such as a paper, a bill, an acrylic, or a glass, etc. Also, the reference medium may have the same size as a medium to be detected such as a bill or check, but the present invention is not limited thereto. For example, the reference medium may have a size less than or equal to that of a portion of a recognizing surface of the light receiving unit 140, which is deviated from the transferring path 160 of the medium. Also, the reference medium 150 may be attached and fixed to the recognizing surface of the light receiving unit 140 or be fixed to a frame (e.g., a frame for protecting the image sensor) of the medium image detection apparatus 100 by a fixing unit such as a separate bracket. That is, the light receiving unit 140 may obtain an image of the reference medium 150 that is fixed in position.

The light emitting unit 130 may comprise a first extension part 131 extending outward from the transferring path 160, and the light receiving unit 140 may comprise a second extension part 141 extending outward from the transferring unit 160. That is, each of the light emitting unit 130 and the light receiving unit 140 may have a width greater than that W of the transferring path 160. Also, the reference medium 150 may be disposed between the first extension part 131 and the second extension part 141. Thus, while the medium M is transferred along the transferring path 160, the medium M may be in non-contact with the reference medium 150.

Thus, when the medium M passes between the light emitting unit 130 and the light receiving unit 140, the light receiving unit 140 may obtain the image of the medium M and the image of the reference medium 150. Here, the images of the reference medium 150 and the medium M are not detected at the same position. The feature in which the images of the reference medium 150 and the medium M are not detected at the same position represents that the images of the reference medium 150 and the medium M do not overlap each other.

Hereinafter, an operation method of the medium image detection apparatus 100 will be described.

Figure 4:
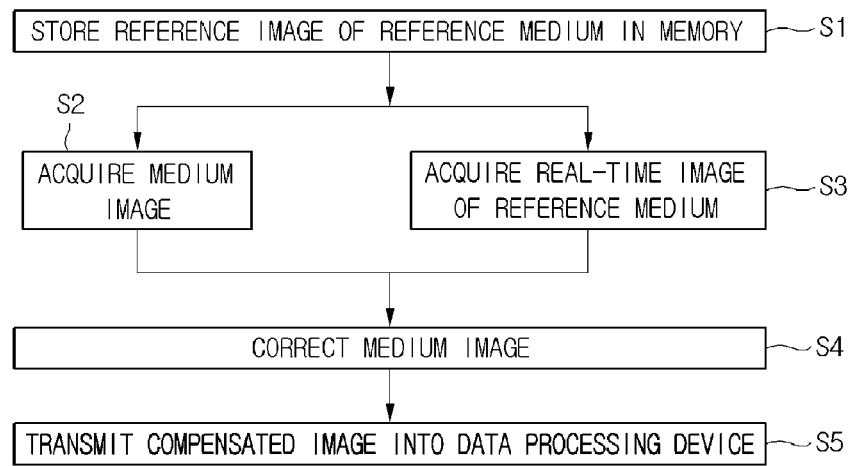
FIG. 4 is a flowchart illustrating an operation process of a medium image detection apparatus according to the present invention.

FIG. 4 is a flowchart illustrating an operation process of a medium image detection device according to the present invention.

Referring to FIGS. 1 to 4, after the medium image detection apparatus 100 is manufactured, a process of initializing the image sensor is performed. The process of initializing the image sensor may comprise a process of setting brightness of an image obtained by the light receiving unit 140 and a process of obtaining a reference image of the reference medium 150 when an experimental medium is transferred.

After the process of setting the brightness of the image obtained by the light receiving unit 140 is finished, the light receiving unit 140 obtains an image of the reference medium 150. In this specification, the reference image of the reference medium 150 may be an image of the reference medium 150 first obtained after the process of setting the brightness of the image obtained by the light receiving unit 140 is finished. The reference image of the reference medium 150 obtained by the light receiving unit 140 is stored in a memory (not shown) (S1).

Thereafter, when the medium M passes through the transferring path 160, the light emitting unit 130 emits light onto the medium M and the reference medium 150. Then, the light receiving unit 140 may receive the light transmitting the medium M and the reference medium 150 to obtain an image of the medium M and an image of the reference medium (S2 and S3).

In this specification, the image of the reference medium 150 obtained together with the image of the medium may be called a real-time image of the reference medium 150.

The medium image detection apparatus 100 may further comprise a control unit 103 for compensating the image of the medium M by using the image of the reference medium 150. The control unit 103 compares brightness of the reference image of the reference medium 150 to the real-time image of the reference medium 150. Also, the control unit 103 compensates brightness of the image of the medium M by a difference between the brightness of the reference image of the reference medium 150 and the brightness of the real-time image of the reference medium 150 (S4).

For example, when it is determined that the brightness of the real-time image of the reference medium 150 is greater than that of the reference image of the reference medium 150, the control unit 103 may compensate the image of the medium M so that the image of the medium M is reduced in brightness.

Also, the compensated image of the medium M is transmitted into a data processing device (S5).

According to the proposed present invention, even though the medium M is changed in transferring speed or in brightness by an ambient temperature, the image of the medium M may be compensated by comparing the brightness of the reference image of the reference medium 160 to the brightness of the real-time image of the reference medium 160 and then reflecting the comparison result to obtain a medium image having constant brightness, thereby preventing the medium from being deteriorated in recognition performance.

Also, the obtained image of the medium M may be compensated by the control unit 103, and then the compensated image may be transmitted into the data processing device. Thus, a time taken for compensating the image of the medium may be reduced when compared that the image is compensated by the data processing device.

Figure 5:
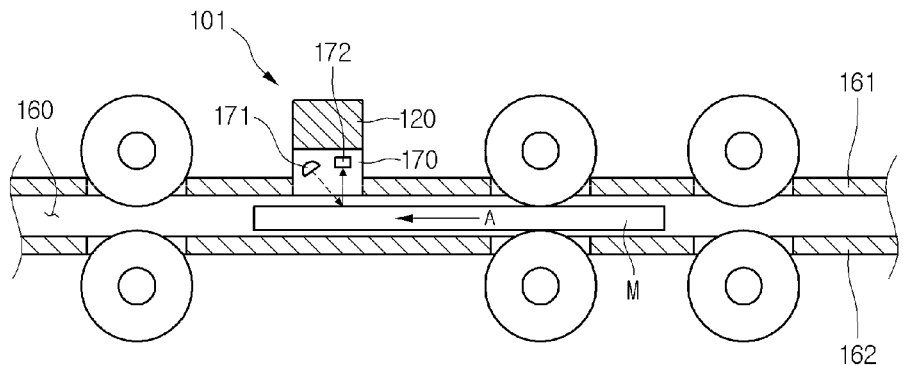
FIG. 5 is a side cross-sectional view of a medium image detection apparatus according to a second embodiment of the present invention.
Figure 6:
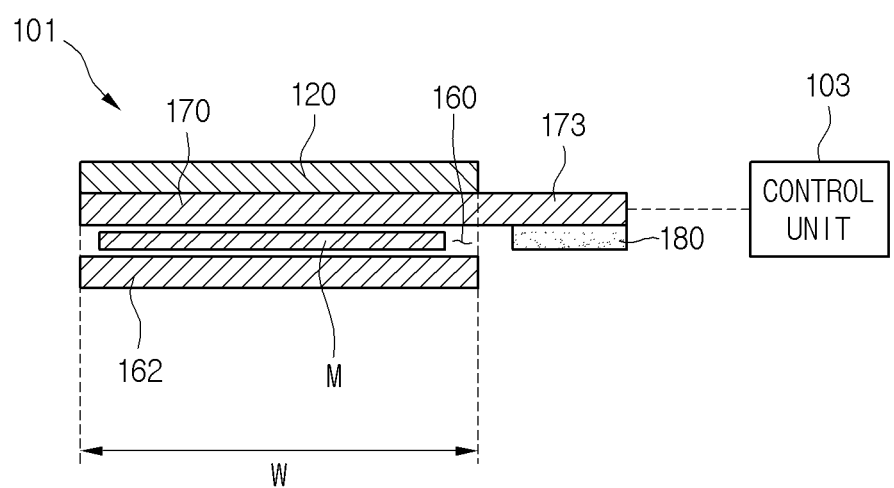
FIG. 6 is a front cross-sectional view of the medium image detection apparatus according to the second embodiment of the present invention.

FIG. 5 is a side cross-sectional view of a medium image detection apparatus according to a second embodiment of the present invention, and FIG. 6 is a front cross-sectional view of the medium image detection apparatus according to the second embodiment of the present invention.

The current embodiment is the same as the first embodiment except for the medium image detection apparatus comprises a reflective image sensor. Thus, only characterized parts of the current embodiment will be principally described below, and descriptions of the same part as that of the first embodiment will be quoted from the first embodiment.

Referring to FIG. 5, a medium image detection apparatus 101 according to the second embodiment of the present invention may comprise an image sensor 170 and a reference medium 180.

The image sensor 170 may be a reflective image sensor. That is, the image sensor 170 may comprise a light emitting unit 171 and a light receiving unit 172. Also, the image sensor 170 may be disposed on one side of a transferring path 160 of a medium M. That is, the light receiving unit 170 may receive light that is emitted from the light emitting unit 171 and then reflected by the medium M.

The image sensor 170 comprises an extension part 173 extending outward from the transferring path 160. That is, the image sensor 170 may have a width greater than that W of the transferring path 160. As described in the first embodiment, the reference medium 180 may be disposed at a position that is deviated from the transferring path 160. Also, the reference medium 180 is disposed at a position facing the extension part 173.

Here, to obtain an image of the reference medium 180 in the extension part 173 of the image sensor 170, the light emitting unit 171 and the light receiving unit 172 may be provided on the extension part 173.

Although the reference medium 180 is manufactured by using a material having reflectivity similar or equal to that of the medium to be detected, the present invention is not limited thereto. For example, the reference medium may be manufactured by using a material such as a paper, a bill, a metal plate, a plastic plate, or an opaque glass. Also, the reference medium may have the same size as a medium to be detected such as a bill or check, but the present invention is not limited thereto. For example, the reference medium may have a size less than or equal to that of a portion of a recognizing surface of the image sensor, which is deviated from a transferring path of the bill. Also, the reference medium 180 may be attached and fixed to the recognizing surface of the extension part 173 of the image sensor 170 or be fixed to a frame (e.g., a frame for protecting the image sensor) of the medium image detection apparatus 101 by a fixing unit such as a separate bracket.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

The invention claimed is:

1. An apparatus for detecting a medium image, the apparatus comprising:
   an image sensor comprising a light emitting unit to emit light toward a medium transferred by a transferring device along a transferring path and a light receiving unit to receive the light emitted from the light emitting unit;
   a reference medium disposed at a position that is deviated from the transferring path to allow the image sensor to obtain an image, wherein the image sensor obtains both the image of the reference medium and the image of the medium while the medium is transferred along the transferring path; and
   a control unit to compensate the image of the medium obtained from the image sensor by using the image of the reference medium obtained from the image sensor.

2. The apparatus of claim 1, wherein the image sensor comprises a transmission image sensor.

3. The apparatus of claim 2, wherein the transferring path is disposed between the light emitting unit and the light receiving unit,
   the light emitting unit comprises a first extension part extending outward from the transferring path, and the light receiving unit comprises a second extension part extending outward from the transferring path, and
   the reference medium is disposed between the first extension part and the second extension part.

4. The apparatus of claim 1, wherein the image sensor comprises a reflective image sensor.

5. The apparatus of claim 4, wherein the image sensor comprises an extension part extending outward from the transferring path, and
   the reference medium is disposed to face the extension part.

6. The apparatus of claim 1, further comprising a memory to store a reference image of the reference medium.

7. The apparatus of claim 6, wherein the image sensor obtains the image of the medium and a real-time image of the reference medium at the same time when the medium is transferred, and
   the control unit compares the real-time image of the reference medium to the reference image of the reference medium to compensate the image of the medium on the basis of the comparison result.

8. The apparatus of claim 7, wherein the control unit compares brightness of the real-time image of the reference medium to brightness of the reference image of the reference medium to compensate brightness of the image of the medium.

9. The apparatus of claim 1, wherein the reference medium is fixed to the image sensor or fixed to a frame for protecting the image sensor.

10. A financial device comprising:
    a transferring path along which a medium is transferred;
    a transferring device to transfer the medium; and
    a medium image detection apparatus comprising a reference medium fixed to a position that is deviated from the transferring path and an image sensor to obtain both an image of the medium transferred along the transferring path and an image of the reference medium while the medium is transferred along the transferring path,
    wherein the medium image detection apparatus compensates the obtained image of the medium by using the image of the reference medium.

11. The financial device of claim 10, wherein the image of the reference medium comprises a reference image previously stored in a memory and a real-time image obtained together with the image of the medium.

12. The financial device of claim 11, wherein the medium image detection apparatus compares brightness of the real-time image of the reference medium to brightness of the reference image of the reference medium to compensate brightness of the image of the medium on the basis of the comparison result.

13. A method for detecting a medium image, the method comprising:
    obtaining a real-time image of a reference medium fixed in position and an image of a transferred medium by using an image sensor while the medium is transferred along a transferring path;
    comparing the real-time image of the reference medium to a reference image of the reference medium, which is previously stored in a memory; and
    compensating the obtained image of the medium on the basis of the comparison result of the real-time image and the reference image of the reference medium.

14. The method of claim 13, wherein the comparing of the real-time image of the reference medium to the reference image of the reference medium comprises comparing brightness of the real-time image of the reference medium to brightness of the reference image of the reference medium.

15. The method of claim 14, wherein the compensating of the obtained image of the medium comprises compensating brightness of the obtained image of the medium.

* * * * *